March 29, 1955 P. L. TORRE 2,705,153
ELASTIC SUSPENSION FOR MOTORCYCLES
Filed April 5, 1951
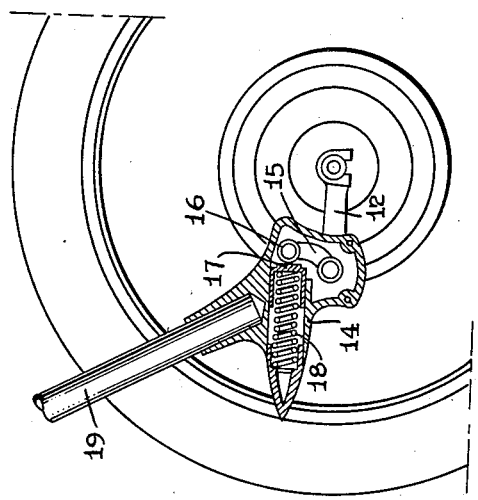
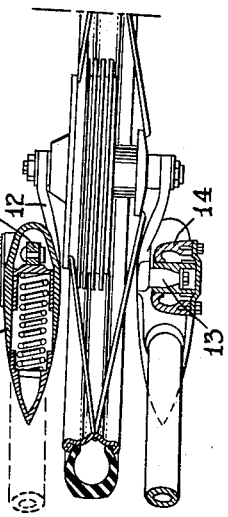
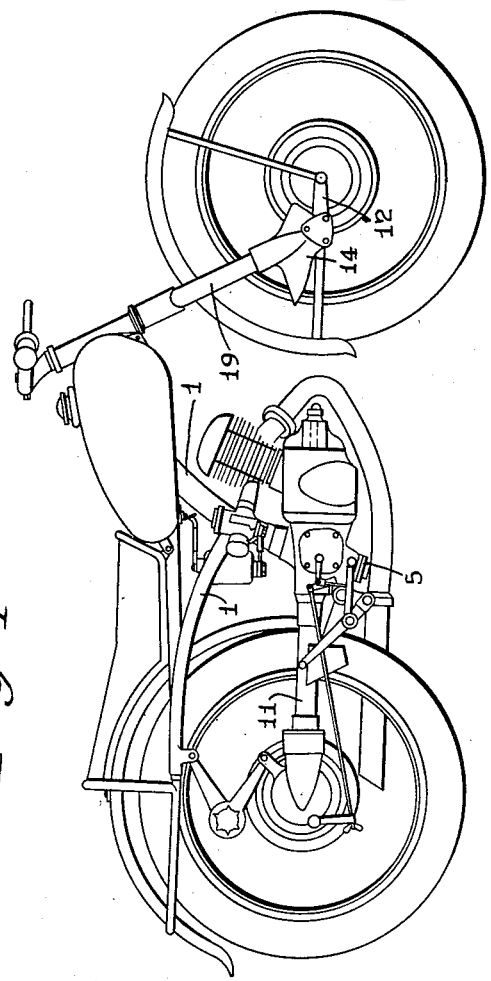
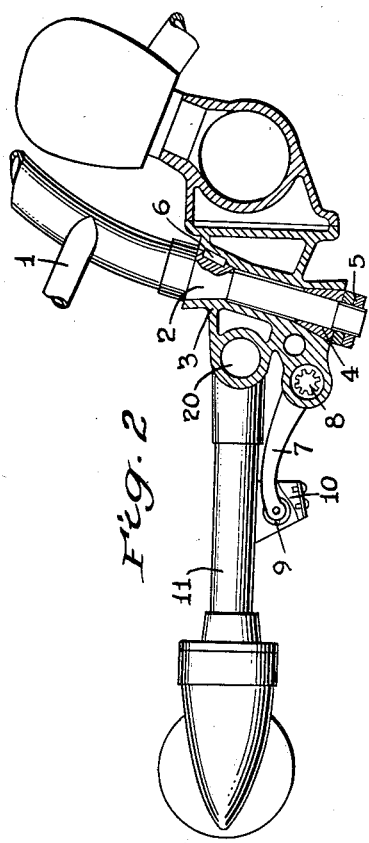
INVENTOR
PIER LUIGI TORRE

United States Patent Office 2,705,153
Patented Mar. 29, 1955

2,705,153

ELASTIC SUSPENSION FOR MOTORCYCLES

Pier Luigi Torre, Milan, Italy

Application April 5, 1951, Serial No. 219,333

Claims priority, application Italy April 6, 1950

1 Claim. (Cl. 280—284)

The present invention relates to tubular frames for motorcycles and the like, and to the front and rear spring suspension of said frames.

It is an object of the present invention to provide a tubular frame for motorcycles shaped so as to be easily anchored to the engine unit in an exceptionally simple way, without needing bolts, and comprising a front and rear spring suspension system that permits an advantageous flexibility in cushioning effect variable within wide limits.

As it is known, a reduction in flexibility, towards the maximum loads, is a desirable feature that affords, in the range of normal reaction, a more advantageous utilization of the elastic characteristics of the system. This feature however is not easily obtainable by means of torsion bars which on the other hand permits the formation of an exceptionally simple structure.

On the engine unit there is hinged the support for the rear wheel which includes one or two tubular arms, according to whether the supporting arrangement of the wheel is of the cantilever or of the forked type. Inside of one of said tubular arms revolves the transmission shaft, coupled to the engine through a universal joint or the like, coaxial with the hinge of the wheel supporting arrangement.

The swing of the wheel support is controlled by a special lever system that acts on one or two torsion bars, incorporated within the engine assembly.

The front wheel of the motorcycle is spring suspended by means of a lever system acting on a shock-absorbing assembly completely closed within a housing that preserves the different movable members from the damaging action of mud, dust and the like, and at the same time constitutes a tight lubrication chamber for these members.

The objects and advantages of the present invention will be best understood by reference to the following detailed description of an illustrative embodiment when taken in conjunction with the drawing, wherein:

Fig. 1 illustrates a motorcycle having a frame constructed according to the invention.

Fig. 2 illustrates the system for anchoring the tubular frame to the crank-case and assembly of the engine, and the spring suspension system for the rear wheel support.

Fig. 3 is a section along the right hand fork through the spring casing; and

Fig. 4 is a horizontal section through the spring casing with the right hand fork and casing shown in full except for a portion broken away along a horizontal plane through the spindle.

The frame 1, clearly shown in Fig. 1, includes a terminal extension 2 (Fig. 2) which fits in a conical seat 3 provided on the engine unit and is locked onto the very unit by means of a lower counter-conical piece 4 forced in its seat by means of nuts 5. A key 6 insures the perfect alignment of the centerlines of the frame and of the corresponding element on the engine unit. A lever 7 is fixed to one end of a torsion bar 8, the other end of which is rigidly connected to the engine unit.

In case the rear wheel support is constructed in the form of a fork, two levers 7 can be mounted on both tubular arms, whereby the torsion bar 8 is rigidly connected to the engine assembly in the plane corresponding to the motorcycle center plane. The other end of lever 7 is shaped in the form of a fork wherein there is provided a roller 9 which, during the spring controlled swinging of the wheel support, rolls over a runway 10 secured to the articulated arm 11. The runway 10 has a suitable profile such that, upon the increase in the cushioned rotation of arm 11, roller 9, sliding over said runway, forces lever 7 to gradually increase its angular rotation and consequently to gradually increase the torsion of bar 8. It will be understood that arm 11 is arranged for swingable movement in a substantially vertical median plane about a pivot axis 20 (see Fig. 2).

By varying the shaped profile of part 10 it is possible to vary easily the cushioning characteristics of the motorcycle rear portion so that in the experimental stage it will be quite easy, by the mere substitution of runways 10, to determine the most convenient cushioning effect. It is obvious that the above described system can be reversed that is it is possible to anchor roller 9 on the articulated arm 11, and shape the end of lever 7 with a convenient profile so that upon the sliding of the thus shaped lever over roller 9, there can be obtained the identical gradual variations in the travel of the articulated arm 11.

The front wheel axle is pivotally mounted between two shackles 12 (Figs. 3 and 4). Shackles or supports 12 are integral with a spindle 13 (Fig. 4) rotatably supported in a suitable seat on the housing 14.

The spindle 13, inside of housing 14, is rigidly coupled to a lever 15 carrying at its end a roller 16 acting upon a slidable spring-biased plug 17 guided by a bushing within housing 14, the latter serving as the endcap for a spring 18. The spring 18 rests against the bottom of a seat provided on the body of housing 14. This housing is integral with arm 19 of the front-wheel fork. During the spring cushioned stroke, the swing of shackle 12 brings about the rotation of lever 15, connected to same, so that roller 16, sliding over plug 17 causes the compression of spring 18.

With this system there is avoided any lateral reaction on the bushing of the spring plug 17.

The reduction in flexibility of the system with increasing loads, may be obtained, through the use of a coil spring of variable pitch, or of appropriately shaped rubber cushions. Moreover, the fact that, while the lever arm of shackle 12 (initially disposed along a horizontal plane) is gradually raised, lever 15 is positioned so that the pressure of roller 16 on the spring-biased plug 17 gradually increases, whereby progressive elevation of the wheel axis relative to the axis of rotation of shackle 12 results in a corresponding, progressive increase in the compression of the antagonistic spring 18.

It will thus be understood that the arrangement of the present invention provides a wheel suspension system comprising a frame (1), an axle for a wheel, supporting means (11, 12) pivotally securing the wheel axle with respect to the frame, elastically deformable means (8 or 18) supported by the frame and adapted to be progressively deformed in response to increasing stress imposed upon the vehicle wheel, and an actuating mechanism operatively connecting the deformable means (8 or 18) with the supporting means (11 or 12), the actuating mechanism being provided with a follower end (9 or 16) abutting against said deformable means or said supporting means, as desired. It will be further understood that the present invention contemplates the use of the described suspension system in connection with the front wheel and/or the rear wheel of a motorcycle, or generally for the wheels of automotive vehicles.

Although I have shown and described a specific structure, it is to be clearly understood that the same was merely for the purpose of illustration and that changes and modifications may readily be made by those skilled in the art without departing from the scope of the appended claim.

Having thus described the invention, what is claimed as new and desired to be secured by Letters Patent is:

A wheel suspension system comprising a frame, an axle for a wheel, supporting means pivotally securing said wheel axle with respect to said frame, said supporting means including a portion provided with a cam-shaped surface, elastically deformable means supported by said frame and adapted to be progressively deformed in response to increasing stress imposed upon said wheel, and an actuating mechanism operatively connecting said deformable means with said supporting means, said actuating mechanism being provided with a follower end abutting against said cam-shaped surface of said portion of said supporting means.

References Cited in the file of this patent

UNITED STATES PATENTS

| | | |
|---|---|---|
| 563,184 | Kirsch-King | June 30, 1896 |
| 1,306,995 | Bradshaw | June 17, 1919 |
| 2,024,199 | Barnes et al. | Dec. 17, 1935 |

FOREIGN PATENTS

| | | |
|---|---|---|
| 96,405 | Switzerland | Oct. 2, 1922 |
| 137,039 | Great Britain | July 15, 1920 |
| 351,913 | Italy | Aug. 25, 1937 |
| 661,377 | Germany | June 17, 1938 |
| 683,137 | Germany | Oct. 31, 1939 |
| 770,709 | France | Sept. 20, 1934 |